United States Patent
Billings et al.

(10) Patent No.: US 8,959,717 B2
(45) Date of Patent: Feb. 24, 2015

(54) CIRCUMFERENTIAL STRAIN ROTARY DETENT

(71) Applicant: Reell Precision Manufacturing Corporation, St. Paul, MN (US)

(72) Inventors: Philip A. Billings, Shoreview, MN (US); George Larson, Roseville, MN (US); Timothy W. Jenum, Saint Paul, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 0 days.

(21) Appl. No.: 13/796,570

(22) Filed: Mar. 12, 2013

(65) Prior Publication Data

US 2013/0237328 A1 Sep. 12, 2013

Related U.S. Application Data

(60) Provisional application No. 61/609,604, filed on Mar. 12, 2012.

(51) Int. Cl.
*E05D 11/10* (2006.01)
*F16D 7/00* (2006.01)

(52) U.S. Cl.
CPC ............ *F16D 7/002* (2013.01); *E05D 11/1028* (2013.01); *E05D 2011/1035* (2013.01)
USPC .................. 16/334; 16/344; 464/37

(58) Field of Classification Search
USPC ...................... 464/37; 16/334, 337, 342, 344; 361/679.27; 379/433.13; 455/575.3
See application file for complete search history.

(56) References Cited

U.S. PATENT DOCUMENTS

| | | |
|---|---|---|
| 2,458,707 A | 1/1949 | Jacobs |
| 2,572,160 A | 10/1951 | Kelly, Jr. et al. |
| 2,572,215 A | 10/1951 | Swart |

(Continued)

FOREIGN PATENT DOCUMENTS

| | | |
|---|---|---|
| DE | 8621214 | 12/1987 |
| EP | 0255879 | 2/1988 |

(Continued)

OTHER PUBLICATIONS

International Search Report for International Application No. PCT/US2013/030517 mailed May 27, 2013 (5 pgs).

(Continued)

*Primary Examiner* — Gregory Binda
(74) *Attorney, Agent, or Firm* — Dicke, Billig & Czaja, PLLC

(57) ABSTRACT

One aspect is a detent device with a first hub having an axis and comprising a first feature having both a radial and an axial dimension relative to the hub axis, and having a first hub connection portion. A second hub is located co-axially outside the first hub and comprises a second feature having both a radial and an axial dimension relative to the hub axis, the second feature of the second hub touching the first feature of the first hub when the features are aligned. The second hub has a second hub connection portion. The first and second features have complementary mating geometries. The detent device is configured such that when relative movement is provided to the first and second hub connection portions, a circumferential strain energy of the second hub changes, providing a variable force between the two connection portions depending on their relative position.

13 Claims, 10 Drawing Sheets

(56) References Cited

U.S. PATENT DOCUMENTS

| | | | |
|---|---|---|---|
| 3,000,049 A * | 9/1961 | Terry, Jr. | 16/334 |
| 3,097,150 A | 7/1963 | Rainer et al. | |
| 3,446,340 A | 5/1969 | Mullen | |
| 3,591,674 A | 7/1971 | Engel | |
| RE29,823 E | 11/1978 | Sievers et al. | |
| 4,231,135 A | 11/1980 | Fradin | |
| 4,445,623 A | 5/1984 | Kolling et al. | |
| 4,452,591 A | 6/1984 | Fishbaugh et al. | |
| 4,506,408 A * | 3/1985 | Brown | 16/342 X |
| 4,626,112 A | 12/1986 | Kramer | |
| 4,654,478 A | 3/1987 | Ishihara et al. | |
| 4,667,530 A | 5/1987 | Mettler et al. | |
| 4,688,961 A | 8/1987 | Shioda et al. | |
| 4,734,955 A * | 4/1988 | Connor | 16/342 X |
| 4,861,107 A | 8/1989 | Vidwans et al. | |
| 4,927,403 A | 5/1990 | Pate, Sr. | |
| 4,932,924 A | 6/1990 | Lobel | |
| 5,000,721 A * | 3/1991 | Williams | 464/37 |
| 5,085,289 A | 2/1992 | Chance | |
| 5,253,947 A | 10/1993 | Petrzelka et al. | |
| 5,397,531 A | 3/1995 | Peiris et al. | |
| 5,509,176 A | 4/1996 | Karl | |
| 5,632,071 A | 5/1997 | Maunder | |
| 5,765,263 A * | 6/1998 | Bolinas et al. | 16/342 |
| 5,832,566 A | 11/1998 | Quek et al. | |
| 5,836,821 A | 11/1998 | Yamada et al. | |
| 5,924,665 A | 7/1999 | Sweere et al. | |
| 5,933,917 A * | 8/1999 | Lo | |
| 6,026,776 A | 2/2000 | Winberg | |
| 6,085,387 A | 7/2000 | Han | |
| 6,101,676 A | 8/2000 | Wahl et al. | |
| 6,173,996 B1 | 1/2001 | Derakhshan et al. | |
| 6,230,365 B1 | 5/2001 | Lu | |
| 6,281,264 B1 | 8/2001 | Salovey et al. | |
| 6,286,187 B1 | 9/2001 | Chang | |
| 6,510,588 B2 | 1/2003 | Eromaki | |
| 6,581,267 B1 | 6/2003 | Olbrich | |
| 6,711,781 B2 | 3/2004 | Hsiu | |
| 6,728,993 B1 | 5/2004 | Murayama | |
| 6,871,383 B2 | 3/2005 | Huang | |
| 6,928,700 B2 | 8/2005 | Huong | |
| 7,153,571 B2 | 12/2006 | Allermann | |
| 7,377,012 B2 | 5/2008 | Lu | |
| 7,500,288 B2 | 3/2009 | Chung et al. | |
| 7,578,031 B2 | 8/2009 | Hung | |
| 7,891,055 B1 | 2/2011 | Combs | |
| 8,523,476 B2 | 9/2013 | Billings | |
| 2002/0174519 A1 | 11/2002 | Huang | |
| 2007/0212162 A1 | 9/2007 | Schank et al. | |
| 2009/0036609 A1 | 2/2009 | Feng et al. | |
| 2009/0038119 A1 | 2/2009 | Rude et al. | |
| 2011/0293356 A1 | 12/2011 | Billings | |

FOREIGN PATENT DOCUMENTS

| | | | |
|---|---|---|---|
| EP | 0 255 879 B1 * | 9/1991 | |
| EP | 1160467 | 12/2001 | |
| EP | 1335090 | 8/2003 | |
| EP | 1999327 | 1/2012 | |
| GB | 747986 | 4/1956 | |
| JP | 5-248448 A * | 9/1993 | 464/37 |
| JP | 769075 | 3/1995 | |
| WO | 9015265 | 12/1990 | |
| WO | 0050717 | 8/2000 | |
| WO | 2005027801 | 3/2005 | |

OTHER PUBLICATIONS

Written Opinion of the International Searching Authority for International Application No. PCT/US2013/030517 mailed May 27, 2013 (6 pgs).

E.I., du Pont de Nemours and Company, "Delrin(R)," DuPont Heritage: Delrin(R), pp. 1 (1995). <http://heritage.dupont.com/floater/fl_deirin/floater.shtml>.

KLC, "Wirsbo AquapexTM, Engel Method Cross-Linked Polyethylene Technical Data Sheet," TECHPEX.doc, pp. 1 (May 4, 2005).

Wikimedia Foundation, Inc., "Delrin," Wikipedia, the free encyclopedia, pp. 1-3 (Jan. 18, 2007). <http://en.wikipedia.org/wiki/Delrin>.

Wikimedia Foundation, Inc., "PEX," Wikipedia, the free encyclopdia, pp. 1-3, (Feb. 2, 2007). <http://en.wikipedia.org/wiki/PEX>.

International Search Report and Written Opinion of the International Searching Authority for International Application No. PCT/US2011/038178 mailed Sep. 1, 2011 (11 pages).

Office Action for EP Application No. 07 752 641.6-2311 mailed Jul. 1, 2009 (3 pages).

International Search Report and Written Opinion for International Application No. PCT/US2007/005957 mailed Aug. 31, 2007 (13 pages).

Office Action for U.S. Appl. No. 12/791,834 mailed Jan. 13, 2012 (24 pages).

Final Office Action for U.S. Appl. No. 12/791,834 mailed May 2, 2012 (16 pages).

Applicant-Initiated Interview Summary for U.S. Appl. No. 12/791,834 mailed Jun. 26, 2012 (5 pages).

Final Office Action for U.S. Appl. No. 12/791,834 mailed Aug. 23, 2012 (13 pages).

Applicant-Initiated Interview Summary for U.S. Appl. No. 12/791,834 mailed Oct. 10, 2012 (3 pages).

Advisory Action for U.S. Appl. No. 12/791,834 mailed Nov. 6, 2012 (3 pages).

Notice of Allowance for U.S. Appl. No. 12/791,834 mailed Apr. 30, 2013 (11 pages).

International Preliminary Report on Patentability for International Application No. PCT/US2011/038178 mailed Dec. 13, 2012 (6 pages).

International Preliminary Report on Patentability for International Application No. PCT/US2007/005957 mailed Sep. 18, 2008 (8 pages).

An English Translation of DE Office Action for Application No. 11 2011 101 885.1 mailed Oct. 17, 2013 (3 pages).

An English Translation of DE Office Action for Application No. 11 2011 101 885.1 mailed Feb. 26, 2014 (4 pages).

Office Action for U.S. Appl. No. 11/683,791 mailed Aug. 7, 2008 (14 pages).

Final Office Action for U.S. Appl. No. 111683,791 mailed Jan. 26, 2009 (9 pages).

Advisory Action for U.S. Appl. No. 11/683,791 mailed Apr. 8, 2009 (3 pages).

Office Action for U.S. Appl. No. 11/683,791 mailed Mar. 18, 2010 (10 pages).

Final Office Action for U.S. Appl. No. 11/683,791 mailed Sep. 22, 2010 (17 pages).

Examiner's Answer for U.S. Appl. No. 11/683,791 mailed Jun. 17, 2011 (18 pages).

Decision on Appeal for U.S. Appl. No. 11/683,791 mailed Jul. 1, 2014 (8 pages).

* cited by examiner

CIRCUMFERENTIAL STRAIN ROTARY DETENT

CROSS REFERENCE TO RELATED APPLICATIONS

This Non-Provisional Patent Application claims the benefit of the filing date of U.S. Provisional Patent Application Ser. No. 61/609,604, filed Mar. 12, 2012, entitled "CIRCUMFERENTIAL STRAIN ROTARY DETENT", which is herein incorporated by reference.

BACKGROUND

Detent features are used in commercial products to establish a user experience indicating a home, closed or operating position. Typically, a detent feature and a complementary second detent feature mating with the first detent feature are used to define a type of camming action during their relative movement. Such features do so by providing a holding force in a home position, assuring the user that the device is being used in a proper position. Such features may also provide a "self-closing" force to help the user achieve a home position. Such detent devices may additionally provide protection to the device during exposure to abuse conditions such as transportation shock and vibration.

Historically, numerous types of loading means have been used between two detent features, among them leaf springs, torsion springs, and compression springs. Often the spring may also serve as one of the two detent features in frictional contact with the other feature. The means of spring loading the first detent feature to the second detent feature allows for both energy storage as well as normal and tangential force loading between the two features. This energy storage and force varies as the device is moved out of one detent position to the next detent position.

However, these loading devices suffer the drawback of storing energy principally through only one type of deflection: torsional strain (compression springs), or bending strain (torsion springs and leaf springs). As a result, these devices must often be large and bulky to achieve the required energy storage and force required. Reducing the size of these devices while maintaining or increasing the energy and force requirements often results in either excessive stresses which may fatigue and/or break the spring element, or excessive frictional wear between the two detent features which degrades performance and the user experience.

Many of the current technologies utilize hardened steel to achieve smaller size while accommodating higher stresses and forces, but do so by requiring an oil or grease to lubricate the complementary detent components to avoid galling.

Many technologies also require more complex assembly methods and a higher number of components. Additionally, other technologies requiring metallic components to ensure reasonable wear and component stresses will have a higher weight, a drawback if weight sensitive components are required, for example, in aircraft.

For these and other reasons, a need exists for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
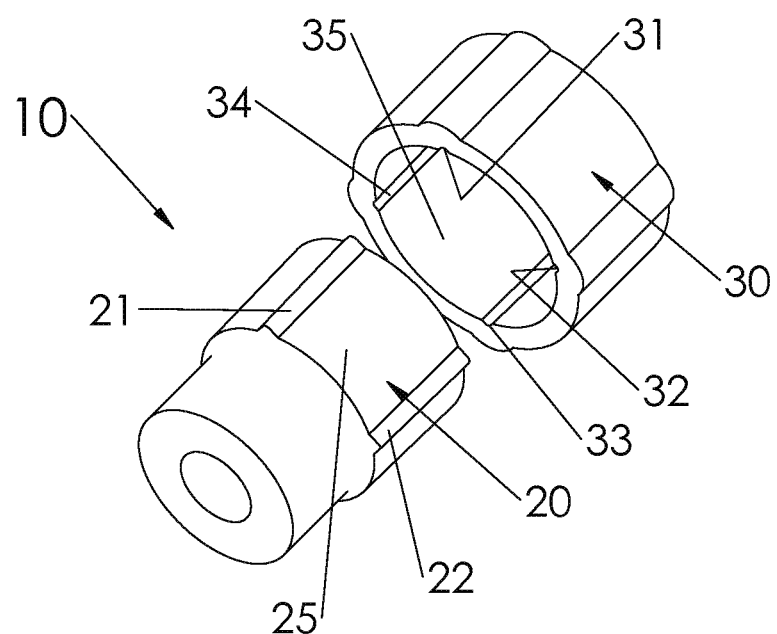
FIG. 1 illustrates an exploded perspective view of a detent device in accordance with one embodiment.

FIG. 1 illustrates detent device 10 in accordance with one embodiment. Detent device 10 includes first hub 20 and second hub 30. In one embodiment, first and second hubs 20 and 30 are generally cylindrical and first hub 20 is configured to be inserted within second hub 30. First hub 20 includes first through fourth protruding ridges 21, 22, 23, and 24 (ridges 23 and 24 are not visible in FIG. 1, but illustrated in FIG. 2) on its outer periphery and second hub 30 includes first through fourth receiving grooves 31, 32, 33, 34 on its inner periphery. In one embodiment, first through fourth protruding ridges 21, 22, 23, and 24 are configured to mate with first through fourth receiving grooves 31, 32, 33, 34.

In one embodiment, first and second hubs 20 and 30 are configured to rotate relative to each other with first hub 20 within second hub 30. The relative rotation produces variable torque characteristics that are favorable for many applications. When first through fourth protruding ridges 21-24 are mated with first through fourth receiving grooves 31-34, that is, when detent device 10 is in a "home position," a first force is require to rotate first hub 20 relative to second hub 30. As ridges 21-24 move out of grooves 31-34, a second force higher than the first force is required for relative rotation of first hub 20 within second hub 30. Once ridges 21-24 move away from grooves 31-34, a third force, lower than the second force, but higher than the first force, is required for relative rotation of first hub 20 within second hub 30. As ridges 21-24 then begin to move back into grooves 31-34, a fourth force lower than each of first, second and third forces, is required for relative rotation of first hub 20 within second hub 30. In one embodiment, fourth force is a relative negative force such that first hub 20 tends to rotate relative to second hub 30 under the influence of the fourth force.

In one embodiment, second hub 30 is made of engineering plastic that will allow the needed circumferential expansion second hub 30 as ridges 21-24 push against second hub 30 as they rotate out of corresponding grooves 31-34. At the same time, the engineering plastic also offers good wear properties for detent device 10, such that there is no need for lubricant between first and second hubs 20 and 30. As such, detent device can withstand many thousands of cycles of relative rotation of first hub 20 relative to second hub 30 without significant variations in the applicable forces (first through fourth referred to above) and without lubricant. First hub 20 can be made of either metal or engineering plastic that has good wear properties when in normal contact with second hub 30.

Figure 2:
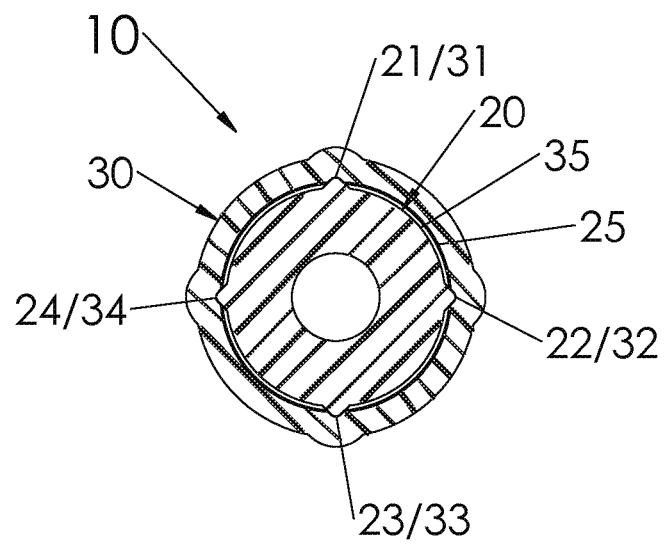
FIG. 2 illustrates a cross-sectional view of a detent device in accordance with one embodiment.

FIG. 2 is a cross-sectional view of detent device 10 in accordance with one embodiment. In FIG. 2, first through fourth protruding ridges 21-24 are mated or aligned with first through fourth receiving grooves 31-34 such that detent device 10 is in the home position. In one embodiment, there is a slight interference of protruding ridges 21-24 with each of the respective receiving grooves in second hub 30 in order to ensure an adequate holding force in the home position. Clearance is provided between nominal first hub outer surface 25 and nominal second hub inner surface 35 in order to optimize the transition force as first hub 20 rotates relative to second hub 30.

Figure 3A:
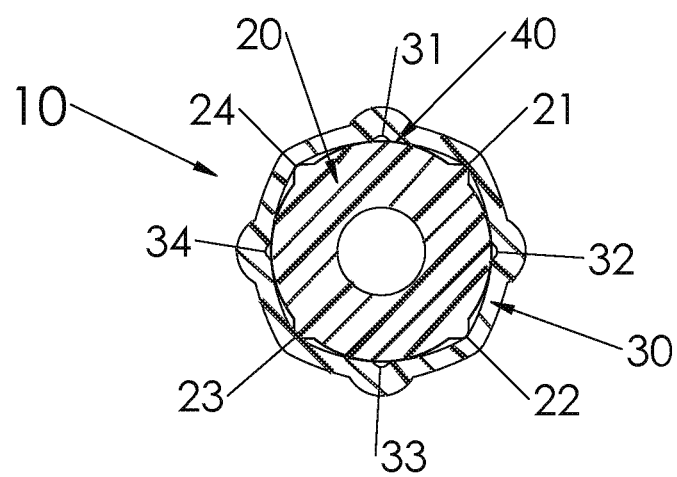
FIGS. 3a-3b illustrate cross-sectional views of a rotated detent device in accordance with one embodiment.

FIG. 3a illustrates detent device 10 with first hub 20 rotated 45 degrees relative to second hub 30. As such, first ridge 21 is 45 degrees advanced in a clockwise direction relative to first groove 31, second ridge 22 is 45 degrees advanced in a clockwise direction relative to second groove 32, third ridge 23 is 45 degrees advanced in a clockwise direction relative to third groove 33, and fourth ridge 24 is 45 degrees advanced in a clockwise direction relative to fourth groove 34. As the protruding ridges 21-24 of first hub 20 are forced out of the corresponding receiving grooves 31-34 of second hub 30, second hub 30 both expands circumferentially—creating hoop strain energy—and bends out-of-round between the contacting ridges 21-24 of first hub 20, creating bending strain energy.

These two elastic strains, circumferential strain and bending strain, serve as a spring function in detent device 10. The combination of circumferential and bending strain creates an efficient detent mechanism requiring a smaller space than those relying principally on one kind of strain energy. The interference of the protruding ridges 21-24 with the inner surface 35 of second hub 30 will determine the frictional force to continue rotating first hub 20 relative to second hub 30 in the condition illustrated in FIG. 3a.

In one embodiment, detent device 10 is configured such that the rotation of first hub 20 and resultant out-of-round bending of second hub 30 causes inner surface 35 of second hub 30 to actually contact outer surface 25 of first hub 20. Configuring detent device 10 in this manner actually limits the amount of bending strain in second hub 30, and increases the amount of circumferential strain. By appropriately configuring the physical dimensions of the device, an optimal amount of bending versus circumferential strain may be achieved, creating very efficient energy storage in the detent device without exceeding stress design limits. One skilled in the art will also appreciate that, although inner surface 35 of second hub 30 is illustrated as circular in its home position in FIG. 2 (apart from the receiving grooves 31-34), it may be other than circular in shape to achieve the desired optimization of bending and circumferential strain. Similarly, although illustrated as circular, the non-ridge portions of outer surface 25 of first hub 20 could also be other than circular in the home position in alternative embodiments.

In one embodiment, detent device 10 is configured with relative circumferences for inner surface 35 and outer surface 25 and relative heights for protruding ridges 21-24 such that the effective circumferential strain in second hub 30 causes at least 2% strain on the material of second hub 30. In one embodiment, the material is engineered plastic. In various embodiments, the material of second hub 30 is acetal or nylon. If the material of second hub 30 were a metal, such as hardened steel, a 2% strain on the material would cause the second hub 30 to break after upon repeated cycles of relative rotation of the hubs. Because second hub 30 is engineered plastic, however, this amount of strain provides favorable force characteristics of detent device 10 over many thousands of cycles between the hubs.

Outer surface 25 defines an effective diameter for first hub 20. In one embodiment, the height of each of protruding ridges 21-24 extending in the radial direction from surface 25 does not exceed 4% of the effective diameter of first hub 20. This relationship of ridge height to hub diameter also controls the amount of strain on the hub and contributes to the favorable force characteristics of detent device 10 over many thousands of cycles between the hubs.

Figure 3B:
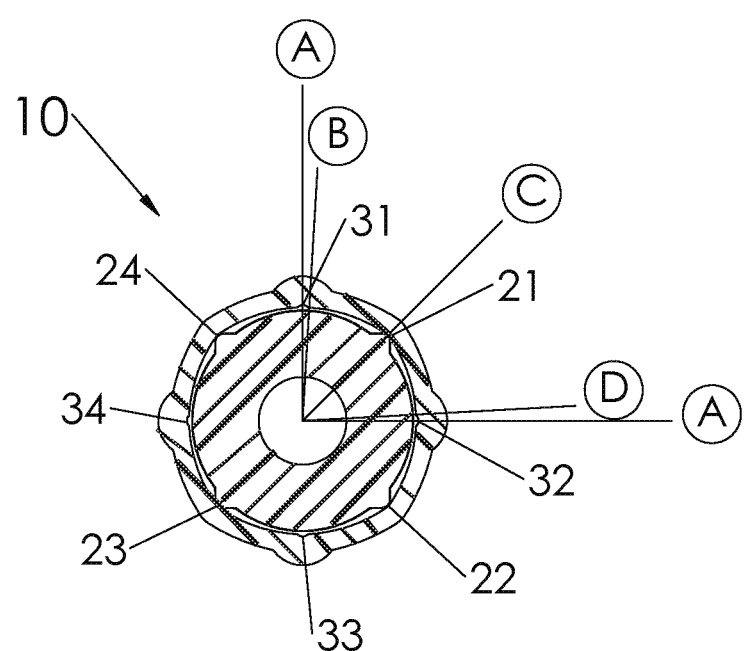

FIG. 3b also illustrates first hub 20 rotated 45 degrees relative to second hub 30. In addition, four positional lines are illustrated extending from the center of detent device 30 through discrete positions around the circumference of the device: a first line A intersect approximately the center of first groove 31; a second line B intersects approximately an edge of groove 31 (the edge that is on a side closer to groove 32); a third line C intersect approximately a midpoint between grooves 31 and 32; and a fourth line D intersects approximately an edge of groove 32 (the edge that is on a side closer to groove 31). The first line A is repeated intersecting approximately the center of groove 32 illustrating the cyclic nature of detent device 10. These lines A-D illustrate relative rotational relationships of first and second hubs 20 and 30 throughout 90 degrees, which are then used to illustrate the corresponding force relationships.

Figure 3C:
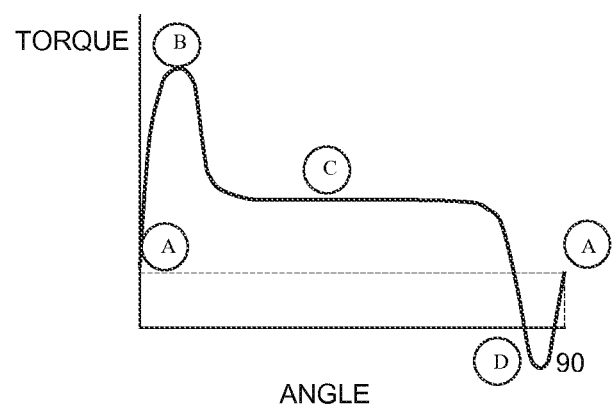
FIG. 3c illustrates a torque versus angle relationship for the detent device in accordance with FIGS. 3a-3b.

FIG. 3c illustrates the force or torque required to move first hub 20 relative to second hub 30 throughout 90 degrees. Using the four positions illustrated in FIG. 3b, FIG. 3c illustrates the required force at each of these approximate positions.

Position A, that is, the position where each of ridges 21-24 are mated with each of grooves 31-34 (illustrated in FIG. 2) represents the home position. There is generally a holding force in this position that is dependent on the amount of interference between ridges 21-24 of first hub 20 with grooves 31-34 of second hub 30. Moving from this home position generally requires some force, a first force represented generally at the position labeled A on FIG. 3c, because this force holds the device in this position.

Position B, that is, the position where each of ridges 21-24 are moving out of each of grooves 31-34 represents the initial transition position. The initial transition position represents the movement of first hub 20 out of its home position up to a point of maximum interference with the inner surface 35 of second hub 30. In one embodiment this represents the maximum force condition, a second force represented generally at the position labeled B on FIG. 3c, for detent device 10. This maximum force is largely governed by the respective dimensions and interference of the ridges 21-24 and grooves 31-34.

Position C, that is, the position where first hub 20 rotated 45 degrees relative to second hub 30 (as illustrated in FIG. 3b) represents the frictional position. The frictional position is a condition where most of the force, a third force represented generally at the position labeled C on FIG. 3c, to maintain movement of first hub 20 relative to second hub 30 is frictional, caused by the interference of the protruding ridges 21-24 of first hub 20 with the inner surface 35 of second hub 30.

Position D, that is, the position where ridges 21-24 of first hub 20 are re-entering receiving grooves 31-34 of second hub 30. Depending on the dimensions of ridges 21-24 and protrusions 31-34, this fourth force, represented generally at the position labeled D on FIG. 3c, may actually be negative before the home position is reached, causing first hub 20 to "self-rotate" unless a restraining (negative) force is applied to prevent such motion.

In one embodiment, detent device 10 provides a force versus angle relationship that is useful in a variety of applications. Furthermore, configuring the circumference of outer surface 25 of first hub 20 relative to the circumference of inner surface 35 of second hub 30 provides control of both circumferential strain and bending strain of second hub 30. This provides favorable spring function in detent device 10 allowing an efficient device requiring a relatively small space. Configuring second hub 35 of an engineered plastic further allows a detent device 10 that is free of any kind of lubrication. This simplifies the design, yet provides thousands of cycles of relative rotation of first and second hubs 20 and 30 while maintaining a substantially consistent force versus angle relationship over these thousands of cycles.

Figure 4:
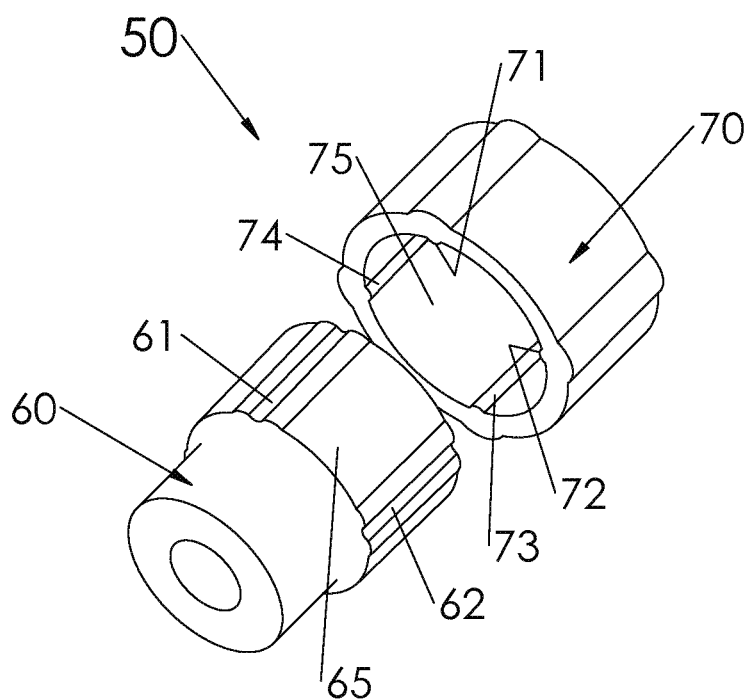
FIG. 4 illustrates an exploded perspective view of a detent device in accordance with one embodiment.

FIG. 4 illustrates detent device 50 in accordance with one embodiment. Detent device 50 includes first hub 60 and second hub 70, and in one embodiment, first and second hubs 60 and 70 are generally cylindrical with first hub 60 configured to be inserted within second hub 70. First hub 60 includes first through fourth receiving grooves 61, 62, 63, and 64 (grooves 63 and 64 are not visible in FIG. 4) on its outer surface 65 and second hub 70 includes first through fourth protruding ridges 71, 72, 73, and 74 on its inner surface 75. In one embodiment, first through fourth receiving grooves 61, 62, 63, and 64 are configured to mate with first through fourth protruding ridges 71, 72, 73, and 74.

Detent device 50 operates similarly to detent device 10 as described above, but with protruding ridges 71, 72, 73, and 74 and receiving grooves 61, 62, 63, and 64 reversed relative to inner surface 75 of second hub 70 and outer surface 65 of first hub 60. Second hub 70 must still allow for circumferential expansion, so its preferred material is a wear resistant engineering plastic, such as acetal or nylon. Also, the circumference of outer surface 65 of first hub 60 is still configured relative to the circumference of inner surface 75 of second hub 70 to control and limit both circumferential strain and bending strain of second hub 70 to provide favorable spring function in a relatively small space.

Just as reversing the ridges and grooves between first hubs 20/60 and second hubs 30/70 retains the essential detent function from circumferential tensile strain of second hub 70 (FIG. 4), one skilled in the art will understand that configuring first hubs 20/60 of a more compliant material than second hub 30/70 will result in circumferential compressive strain of first hub 20/60, achieving the same detent function.

In both detent devices 10 and 50, outer surface 25/65 of first hub 20/60 and inner surface 35/75 of second hub 30/70 are illustrated as having complementary mating geometries. By "complementary mating geometries" of the two detent surfaces—protruding ridges 21/71, 22/72, 23/73, and 24/74 and receiving grooves 31/61, 32/62, 33/63, and 34/64 in the illustrated embodiments—it is meant that the surfaces are functionally complementary, and that one feature moves radially inward towards the other when the two features are aligned (home position), allowing second hub 30/70 to relax its circumferential expansion and lower the normal force between the two features. In other words, a protruding ridge moves at least partway into a receiving groove (or the opposite, depending on which hub has which feature).

Figure 5A:
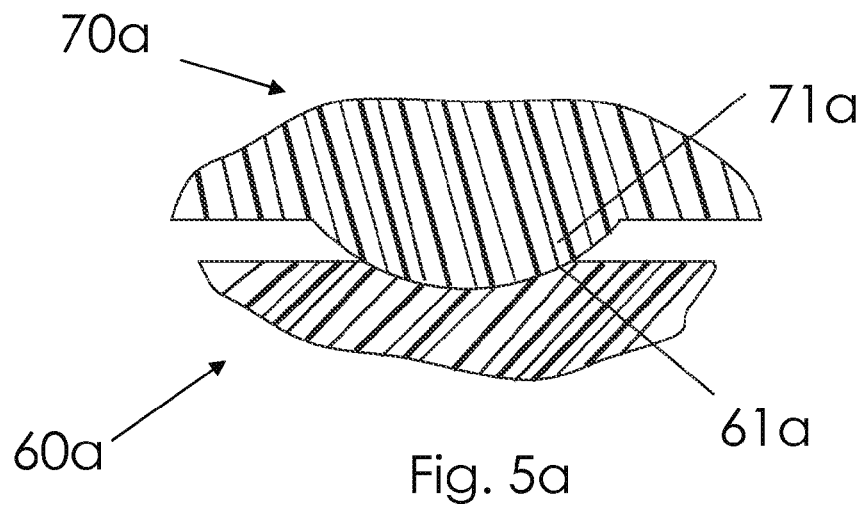
FIGS. 5a-5d illustrate partial views of a detent device in accordance with FIG. 4, and illustrate alternate complementary geometries.
Figure 5B:
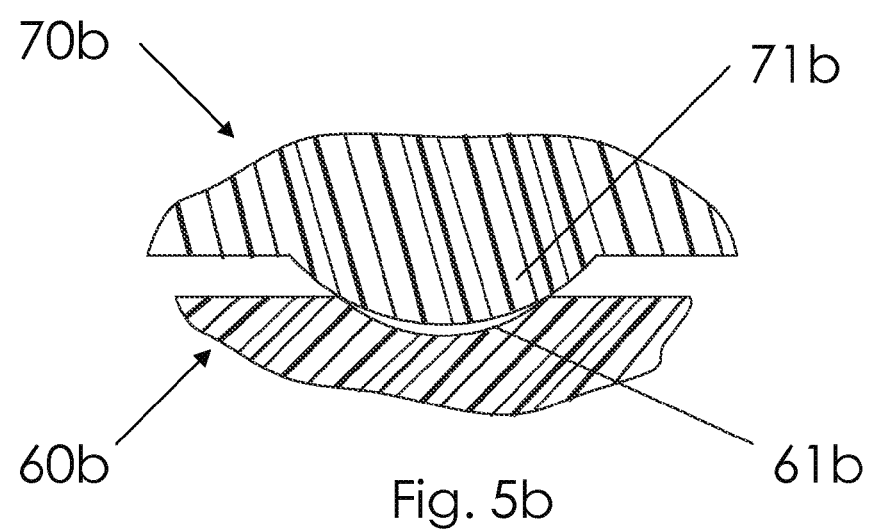
Figure 5C:
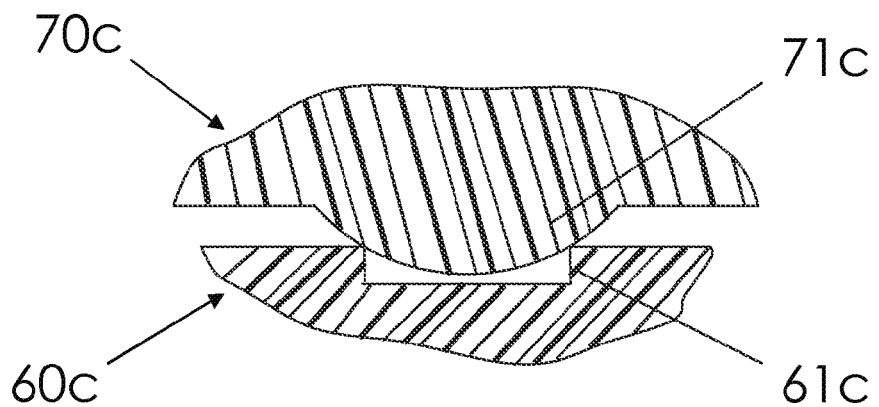
Figure 5D:
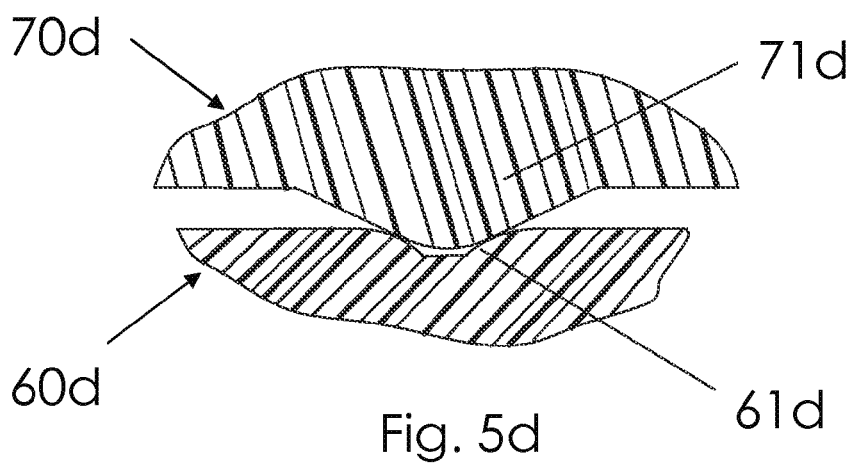

FIGS. 5a-5d illustrate embodiments of various complementary mating geometries for first ridge 71 and first grove 61 from detent device 50. FIG. 5a illustrates first ridge 71a and first grove 61a with geometries that are substantially dimensionally equivalent, such that when it the home position first ridge 71 and first grove 61 share an adjacent border. FIGS. 5b-5d illustrate alternate complementary mating geometries for first ridge 71b/c/d and first grove 61b/c/d that are not dimensionally equivalent, but that achieve the same functional result. One skilled in the art of cam design will understand that normal design methodologies are used to determine the profiles of the protruding ridges and receiving grooves in a manner that results in desirable and allowable forces, energy storage, contact stresses, and wear.

Detent devices 10 and 50 are illustrated with four protruding ridges and four receiving grooves spaced substantially equidistant around the respective perimeters of the hubs. Other embodiments can use less protrusions and complementary grooves, for example one, two or three. Furthermore, larger numbers of protrusions and complementary grooves can be used. Also, the spacing between the pairs of protrusions and complementary grooves can be varied around the circumference of the hubs dependent on the desired performance characteristics of the detent device.

Figure 6A:
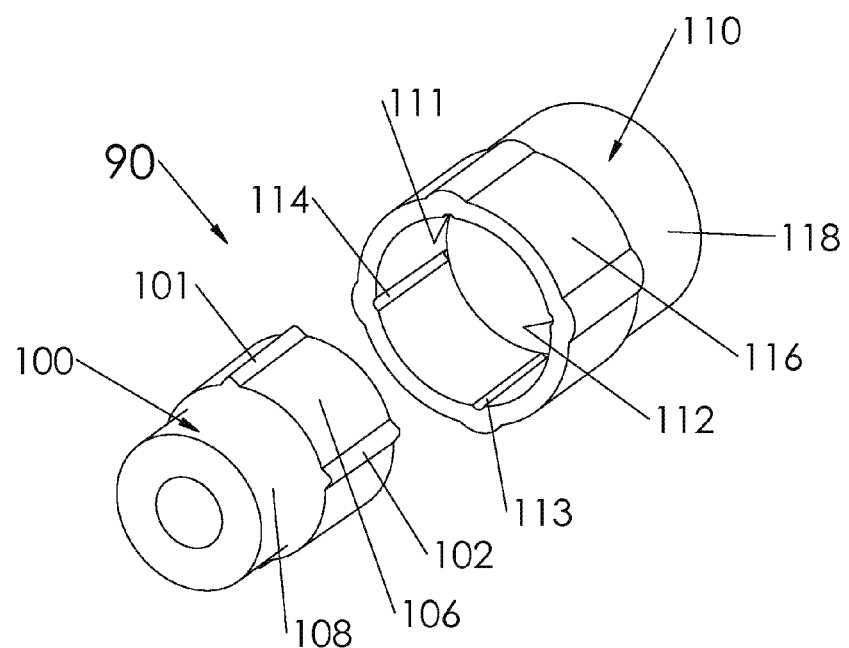
FIGS. 6a-6b illustrate exploded perspective views of detent devices in accordance with alternative embodiments.

FIG. 6a illustrates detent device 90 in accordance with one embodiment. Detent device 90 includes first hub 100 and second hub 110. First hub 100 includes first hub main portion 106 and first hub connection portion 108 and second hub 110 includes second hub main portion 116 and second hub connection portion 118. In one embodiment, first and second hub main portions 106 and 116 are generally cylindrical with first hub main portion 106 configured to be inserted within second hub main portion 116, thereby providing a detent device with operational characteristics consistent with that described above with respect to devices 10 and 50.

First hub main portion 106 includes first through fourth protruding ridges 101, 102, 103, and 104 (ridges 103 and 104 are not visible in FIG. 6a) on its outer surface and second hub main portion 116 includes first through fourth receiving grooves 111, 112, 113, and 114 on its inner surface. In one embodiment, first through fourth receiving grooves 111, 112, 113, and 114 are configured to mate with first through fourth protruding ridges 101, 102, 103, and 104.

In one embodiment, first and second hub connection portions 108 and 118 facilitate the circumferential expansion of first and second hubs 100 and 110 and allow connection of detent device 90 into further mechanism, such as hinges. First and second hub connection portions 108 and 118 can be readily coupled to other devices, such as hinge devices, for controlled relative rotations providing force versus angle characteristics similar to that illustrated in FIG. 3c due to the interaction of first hub main portion 106 and second hub main portion 116.

Figure 6B:
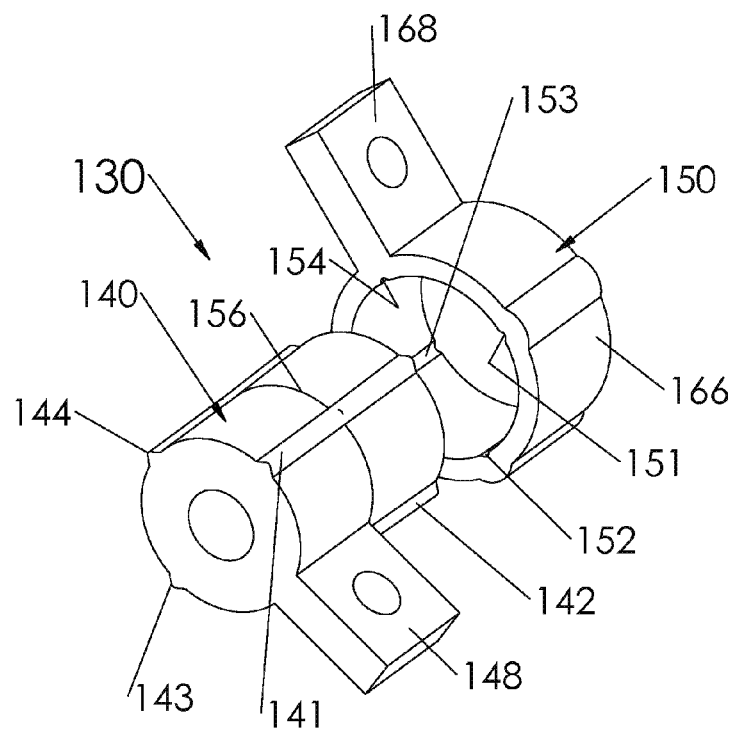

FIG. 6b illustrates detent device 130 in accordance with one embodiment. Detent device 130 includes first hub 140 and second hub 150. First hub 140 includes first hub main portion 146 and first hub connection portion 148 and second hub 150 includes second hub main portion 166 and second hub connection portion 168. In one embodiment, first and second hub main portions 146 and 166 are generally cylindrical with first hub main portion 146 configured to be inserted within second hub main portion 166, thereby providing a detent device with operational characteristics consistent with that described above with respect to devices 10 and 50.

First hub main portion 146 includes first through fourth protruding ridges 141, 142, 143, and 144 on its outer surface and second hub main portion 166 includes first through fourth receiving grooves 151, 152, 153, and 154 on its inner surface. In one embodiment, first through fourth receiving grooves 141, 142, 143, and 144 are configured to mate with first through fourth protruding ridges 151, 152, 153, and 154.

In one embodiment, first and second hub connection portions 148 and 168 facilitate the radial expansion of first and second hubs 140 and 150 and allow connection of detent device 130 into further mechanism, such as hinges. First hub main portion 146 is expanded axially relative to second hub main portion 166, such that once first hub main portion 146 is inserted into second hub main portion 166, a section of first hub main portion 146 that is coupled to first hub connection portion 148 extends outside second hub main portion 166 such that there is no interference between second hub main portion 166 and first hub connection portion 148. In this way, first and second hub connection portions 148 and 168 can be readily coupled to other devices, such as hinge devices, for controlled relative rotations.

Embodiments, such as illustrated for detent devices 10, 50, 90 and 130, provide controlled relative rotation having force versus angle characteristics similar to that illustrated in FIG. 3c. These detent devices are light weight with utilization of engineering plastics for the hubs. Furthermore, these devices are lubricant free, yet able to provide repeatable torque over many thousands of cycles of relative rotation of the hubs. The devices are spatially efficient through the storage of energy by circumferential as well as bending strain. The detent devices are easy to assemble and contain a minimum number of parts.

Figure 7:
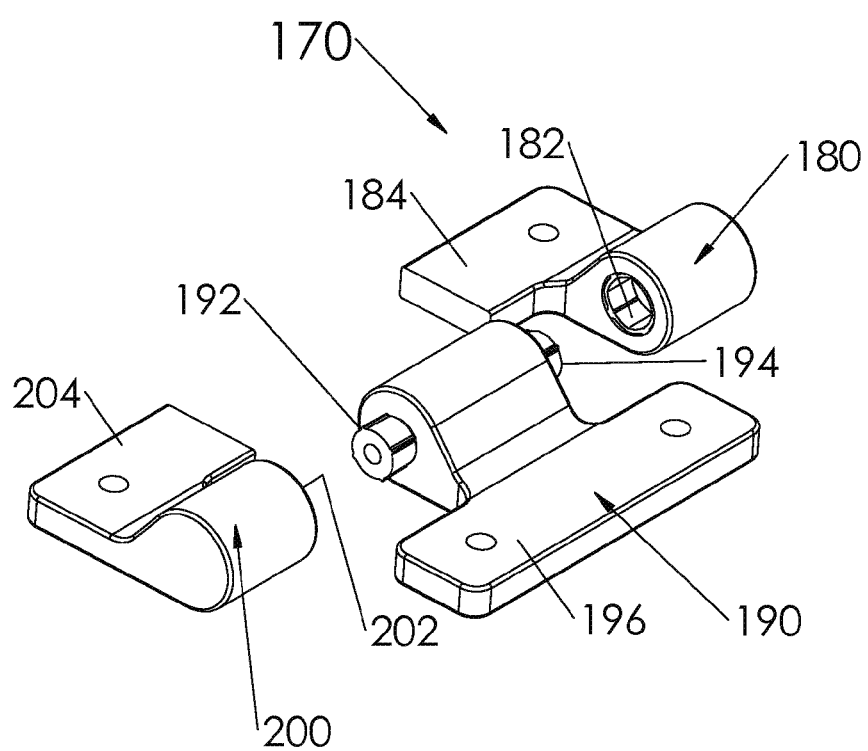
FIG. 7 illustrates a detent device implemented in a hinge design in accordance with one embodiment.

FIG. 7 illustrates a partially exploded view of detent hinge 170 in accordance with one embodiment. In one embodiment, detent hinge 170 illustrates a practical implementation of two detent devices, such as detent device 10 described above. Detent hinge 170 includes first, second, and third hinge sections 180, 190 and 200. First hinge section 180 includes first connection 184 and first receiving hub 182. Second hinge section 190 includes second connection 196, first extending hub 194, and second extending hub 192. Third hinge section 200 includes third connection 204 and second receiving hub 202.

When assembled, first extending hub 194 of second hinge section 190 is inserted in first receiving hub 182 of first hinge section 180. In one embodiment, first extending hub 194 includes a plurality of ridges and first receiving hub 182 includes a plurality of receiving grooves configured to mate with the ridges, similar to that described above with the various detent devices. Similarly, second extending hub 192 of second hinge section 190 is inserted in second receiving hub 202 of third hinge section 200. In one embodiment, second extending hub 192 includes a plurality of ridges and second receiving hub 202 includes a plurality of receiving grooves configured to mate with the ridges, similar to that described above with the various detent devices. Furthermore, first and second receiving hubs 182 and 202 are configured to circumferentially expand, thereby providing both circumferential and bending strain.

In operation, first, second, and third hinge sections 180, 190 and 200 are coupled to two or more bodies for relative rotation. For example, second connection 196 can be mounted to a base of a laptop computer, while first connection 184 and third connection 204 are coupled to a screen of the laptop computer. This allows the screen of the computer to rotate relative to the base under the force influence of the two detent devices formed from the combination of first receiving hub 182 of first hinge section 180 rotating about first extending hub 194 of second hinge section 190 and second receiving hub 202 of third hinge section 200 rotating about second extending hub 192 of second hinge section 190. The torque profile in one embodiment is similar to that given in FIG. 3c.

In one embodiment, first, second, and third hinge sections 180, 190 and 200 can be mounted to three different rotatable bodies. For example, second connection 196 can be mounted to a base, while first and third hinge sections 180 and 200 are respectively each mounted to first and second rotatable bodies. As such, the first body is rotatable relative to the base under the influence of the detent device formed from first receiving hub 182 of first hinge section 180 rotating about first extending hub 194 of second hinge section 190. The second body is rotatable relative to the base under the influence of the detent device formed from second receiving hub 202 of third hinge section 200 rotating about second extending hub 192 of second hinge section 190.

Figure 8:
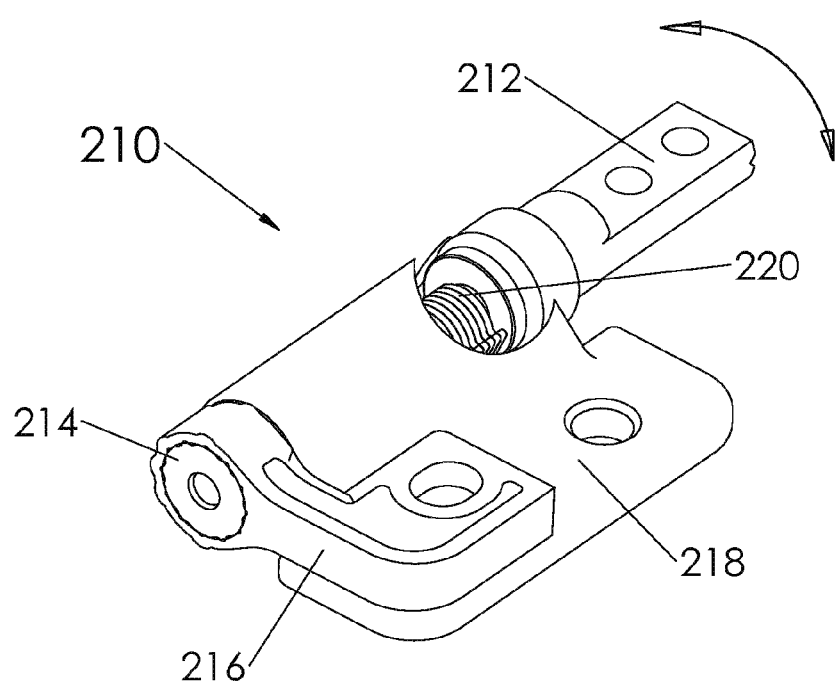
FIG. 8 illustrates a detent device implemented in a hinge design in accordance with one embodiment.

FIG. 8 illustrates detent friction hinge 210 in accordance with one embodiment. Detent friction hinge combines a detent device, such as described above with respect to detent devices 10 and 50, with a friction hinge, that is, a constant torque clutch, in order to achieve a higher and more controlled friction between detent positions. In one embodiment, detent friction hinge 210 includes first hinge portion 212, second hinge portion 218, first hub 214 and second hub 216. First hinge portion 212 is mounted to a first hinged body and second hinge portion 218 is mounted to a second hinged body, such that the first and second hinges bodies can be rotated relative to each other under the control of detent friction hinge 210.

In one embodiment, a plurality of frictional elements 220 are provided between first hinge portion 212 and second hinge portion 218 to provide a frictional rotational force therebetween (in FIG. 8, a portion of second hinge portion 218 is cut away to partially reveal frictional elements 220). In addition, first hub 214 in configured with protruding ridges and second hub 216 is configured with grooves to form complementary mating geometries. As the first and second hinges bodies are rotated relative to each other, detent friction hinge 210 creates resistance to rotation from frictional elements 220 between first hinge portion 212 and second hinge portion 218, as well as from the resistance of the protruding ridges of first hub 214 with the receiving grooves of second hub 216. Frictional elements 220 essentially work in series with the detent device created by first and second hubs 214 and 216.

In one embodiment, detent friction hinge 210 accordingly provides controlled friction between detent positions, while providing a user with a sense of reaching a desired home position, a reduction of force during this final movement, and a firm holding force once in the home position.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A detent device comprising:
   a first hub having an axis and comprising a plurality of protruding ridges having both a radial and an axial dimension relative to the hub axis, and having a first hub connection portion; and
   a second hub located co-axially outside the first hub and comprising a plurality of receiving grooves having both a radial and an axial dimension relative to the hub axis, the plurality of receiving grooves of the second hub touching the plurality of protruding ridges of the first hub when the plurality of protruding ridges and plurality of receiving grooves are aligned, the second hub having a second hub connection portion;
   wherein the plurality of protruding ridges and plurality of receiving grooves have complementary mating geometries;
   wherein the detent device is configured such that relative movement of the first and second hub connection portions causes a circumferential strain energy of the second hub to change, providing a variable force between the two connection portions depending on their relative position;
   wherein a surface of the first hub defines a diameter and the plurality of protruding ridges extend from the surface a distance that does not exceed 4% of the diameter of the first hub; and
   wherein the circumferential strain in the second hub causes at least 2% strain on the material of the second hub.

2. The detent device of claim 1, wherein one of the plurality of protruding ridges and plurality of receiving grooves causes bending strain energy on the second hub when the plurality of protruding ridges and plurality of receiving grooves are not aligned.

3. The detent device of claim 1, wherein one of the first and second hub comprises an engineered plastic and characterized in that the detent device is free of a lubricant between the first and second hubs.

4. The detent device of claim 1 configured to produce substantially consistent force as the first and second hub connection portions are rotated relative to each other for at least two thousand cycles of relative rotation.

5. The detent device of claim 1, wherein the first hub is rotationally grounded to an axis of a constant torque clutch.

6. A detent device comprising:
   a first hub having at least two protruding ridges and a first hub connection portion; and
   a second hub configured co-axially and adjacent the first hub and having at least two receiving grooves configured to receive and contact the respective two ridges of the first hub when the grooves and ridges are aligned, the second hub further configured with a second hub connection portion;
   wherein relative movement of the first and second hub connection portions changes a circumferential strain energy of the second hub thereby providing a cyclical variable force between the first and second hub connection portions comprising a holding force when all ridges are within the grooves, followed by a maximum force when all ridges are moving out of the grooves, followed by a frictional force when all ridges are outside the grooves, followed by a negative force when all ridges are moving into the grooves, and wherein these forces repeat cyclically in sequence;
   wherein a surface of the first hub defines a diameter and wherein the at least two protruding ridges extend from the surface a distance that does not exceed 4% of the diameter; and
   wherein the circumferential strain in the second hub causes at least 2% strain on the material of the second hub.

7. The detent device of claim 6, wherein the first hub is co-axially within the second hub.

8. The detent device of claim 6, wherein the second hub is co-axially within the first hub.

9. The detent device of claim 6 further comprising the first hub having at least four protruding ridges and the second hub having at least four receiving grooves.

10. The detent device of claim 9, wherein the second hub is configured to expand circumferentially when the at least four ridges move out of the at least four receiving grooves and wherein the second hub is further configured to create a bending strain between two adjacent ridges when the at least four ridges are out of the at least four receiving grooves.

11. The detent device of claim 6, wherein one of the first and second hub comprises an engineered plastic and characterized in that the detent device is free of a lubricant between the first and second hubs.

12. The detent device of claim 6 configured to produce substantially consistent force as the first and second hub connection portions are rotated relative to each other for at least two thousand cycles of relative rotation.

13. A detent device comprising:
   a first hub having an axis and comprising a plurality of grooves having both a radial and an axial dimension relative to the hub axis, and having a first hub connection portion; and
   a second hub located co-axially outside the first hub and comprising a plurality of protruding ridges extending radially inward toward the first hub and having both a radial and an axial dimension relative to the hub axis, the plurality of protruding ridges of the second hub touching the plurality of grooves of the first hub when aligned, the second hub having a second hub connection portion;
   wherein the plurality of grooves and plurality of protruding ridges have complementary mating geometries;
   wherein the detent device is configured such that relative movement of the first and second hub connection portions causes a circumferential strain energy of the second hub to change, providing a variable force between the two connection portions depending on their relative position;
   wherein an inner surface of the second hub defines an inner diameter and wherein the plurality of protruding ridges extend from the surface a distance that does not exceed 4% of the inner diameter; and
   wherein the circumferential strain in the second hub causes at least 2% strain on the material of the second hub.

* * * * *